(12) United States Patent
Heijnen et al.

(10) Patent No.: US 6,371,211 B1
(45) Date of Patent: Apr. 16, 2002

(54) METHOD OF CREATING A WELD IN A WELLBORE

(75) Inventors: Wilhelmus Hubertus Paulus Maria Heijnen, Nienhagen (DE); Djurre Hans Zijsling, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/626,061

(22) Filed: Jul. 26, 2000

(51) Int. Cl.7 .............................................. E21B 19/00
(52) U.S. Cl. ........................ 166/378; 166/277; 166/129
(58) Field of Search ................................. 166/313, 378, 166/307, 277, 151, 149, 369, 191

(56) References Cited

U.S. PATENT DOCUMENTS 5,295,393 A * 3/1994 Theircelin .................... 73/155
5,875,852 A * 3/1999 Floyd et al. ................. 166/387

FOREIGN PATENT DOCUMENTS

WO WO 98/02638 * 1/1998 ........... E21B/47/00

* cited by examiner

Primary Examiner—David Bagnell
Assistant Examiner—Daniel P Stephenson

(57) ABSTRACT

A method of creating a weld to connect a first element to a second element, said elements being arranged in a wellbore containing a wellbore fluid, is provided. The method comprises selecting a welding path along which the weld is to be created, selecting a volume portion of the wellbore, in which selected volume portion said path is located and sealing said selected volume portion from the remainder of the wellbore volume, and providing pressure control means for controlling the fluid pressure in said selected volume portion. The pressure control means is then operated so as to reduce the fluid pressure in said selected volume portion to a selected pressure at which the weld can be created, and the weld is created along the selected welding path.

14 Claims, 2 Drawing Sheets

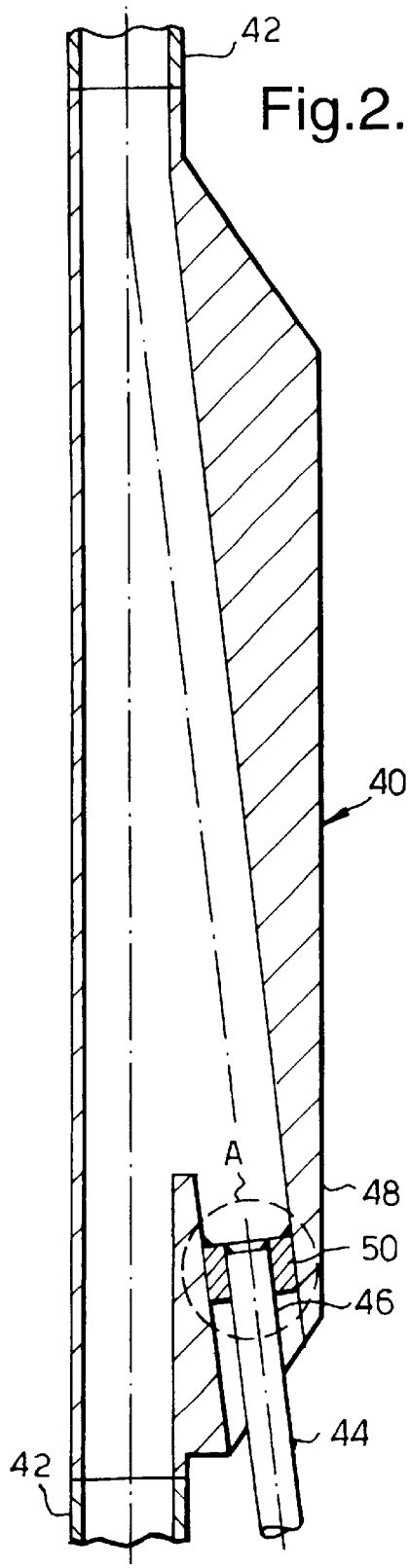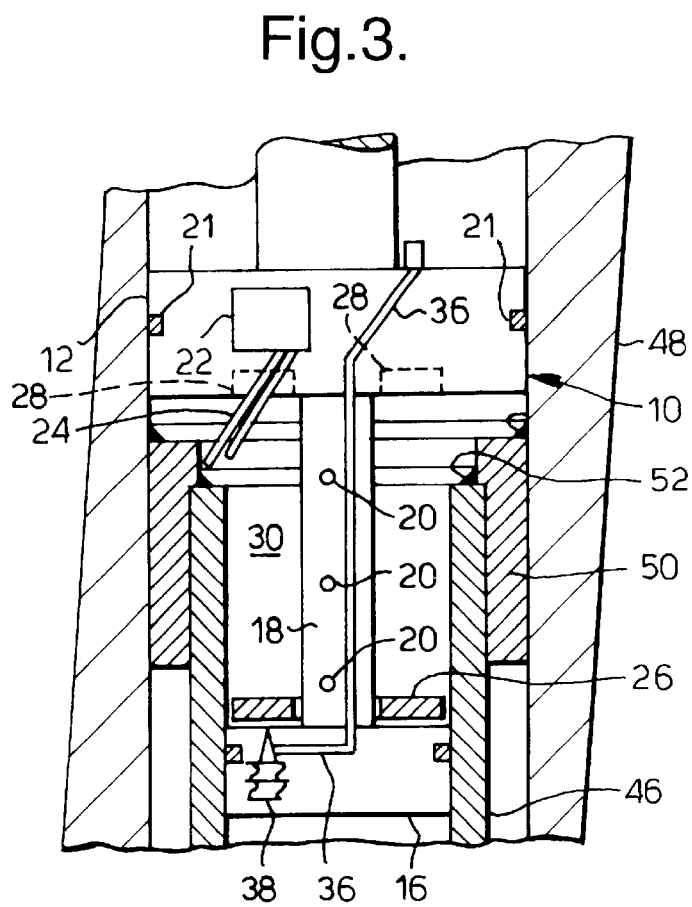

METHOD OF CREATING A WELD IN A WELLBORE

Figure 1:
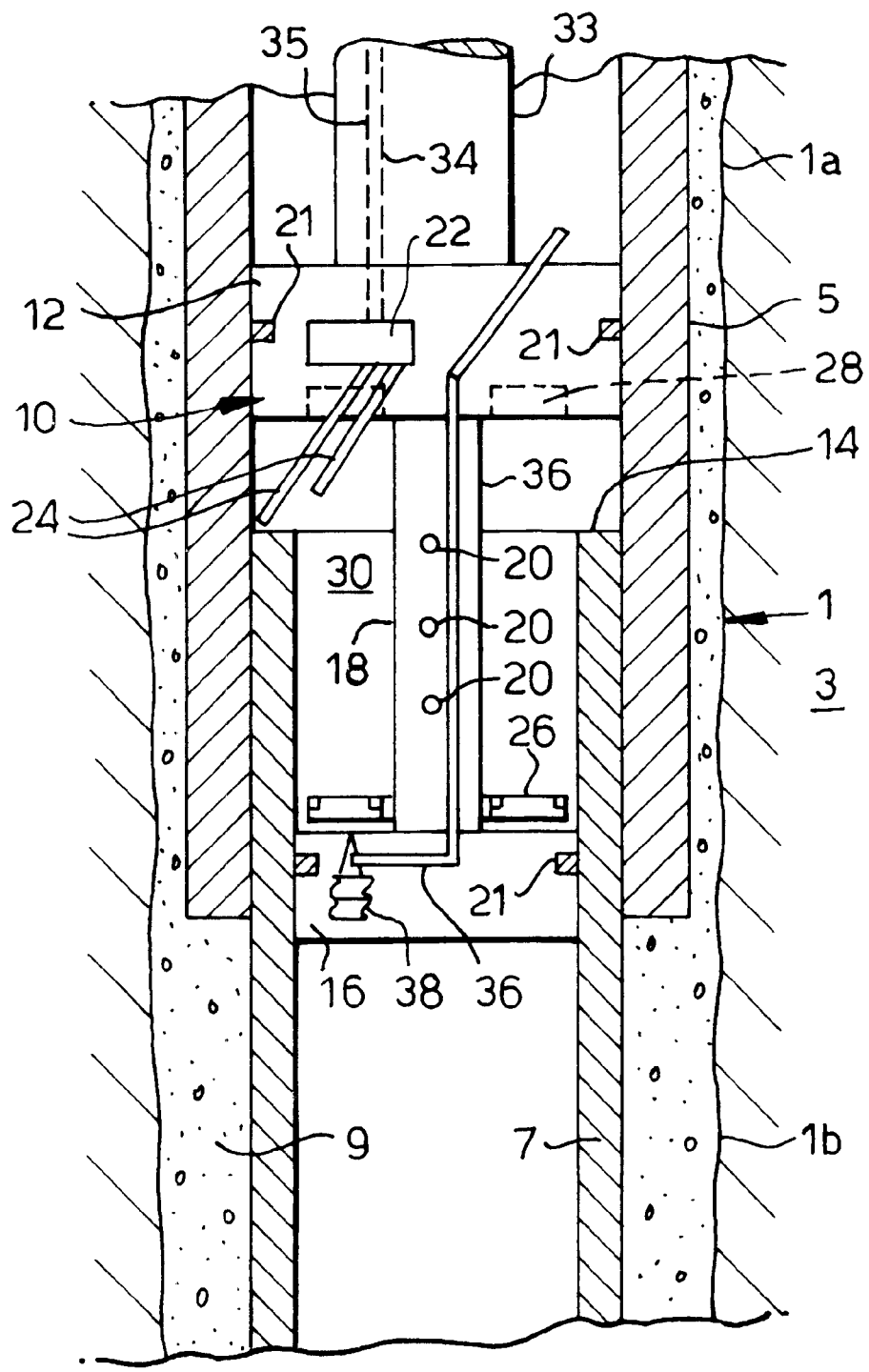

The present invention relates to a method of creating a weld to connect a first element to a second element. For a variety of applications it would be desirable to provide a method of creating a weld in a wellbore formed in an earth formation, the wellbore containing a wellbore fluid. Such applications include, for example, forming of metal-to-metal seals, providing structural integrity to wellbore components or repairing corrosion damage. However welding in a liquid environment (the wellbore fluid) at high pressures generally encountered in wellbores, is not feasible. An analogous situation exists for underwater welding, e.g. at offshore platforms, whereby the depth at which such welding is feasible is limited by the hydrostatic pressure of the water.

It is an object of the invention to provide a method of creating a weld to connect a first element to a second element, said elements being arranged in a wellbore containing a wellbore fluid.

The method according to the invention comprises a) selecting a welding path along which the weld is to be created;

b) selecting a volume portion of the wellbore, in which volume portion said path is located, and sealing said selected volume portion from the remainder of the wellbore volume;

c) providing pressure control means for controlling the fluid pressure in said selected volume portion;

d) operating the pressure control means so as to reduce the fluid pressure in said selected volume portion to a selected pressure at which the weld can be created; and e) creating the weld along the selected welding path.

By sealing the volume portion in which the weld is to be created from the remainder of the wellbore, and subsequently reducing the pressure in the volume portion, the fluid pressure no longer prevents the creation of the weld.

Suitably the first element is an upper wellbore casing and the second element is a lower wellbore casing having an upper part extending into a lower part of the upper wellbore casing. In this manner metal-to-metal sealed casings are obtained allowing gas at high pressure to be produced through the wellbore casing rather than through a conventional production tube extending through the wellbore casing.

In a preferred embodiment said upper part has an outer diameter substantially equal to the inner diameter of said lower part, and step e) comprises welding the upper edge of the lower casing to the upper casing.

In another preferred embodiment said upper part has an outer diameter smaller than the inner diameter of the lower part, and wherein the method further comprises inserting a filler tube in the annular space between said upper part and said lower part, and wherein step e) comprises welding the upper edge of the lower casing to the filler tube and welding the upper edge of the filler tube to the upper casing.

To allow high pressure gas production from a multilateral wellbore system, suitably the wellbore is a main wellbore provided with a branch wellbore, said first element being a branch of a branch casing member which connects a main casing extending through the main wellbore to a branch casing extending through the branch wellbore, said second element being the branch casing.

The invention will be described hereinafter in more detail and by way of example with reference to the accompanying drawings in which FIG. 1 schematically shows a longitudinal cross-section of a system used in conjunction with a first embodiment of the method of the invention;

FIG. 2 schematically shows a longitudinal cross-section of a system used in conjunction with a second embodiment of the method of the invention;

FIG. 3 schematically shows detail A of FIG. 2.

In the Figures like reference numerals relate to like components.

The system shown in FIG. 1 includes a wellbore 1 formed in an earth formation 3, the wellbore being provided with a first element in the form of upper wellbore casing 5 extending in an upper part 1a of the wellbore and a second element in the form of lower wellbore casing 7 extending in a lower part 1b of the wellbore 1. The lower casing 7 has an outer diameter substantially equal to the inner diameter of the upper casing 5 and extends partly into the upper casing 5. A layer of cement 9 is arranged in the annular space between the two casings on one hand and the wellbore wall on the other hand.

A welding system 10 is arranged in the wellbore 1, the welding system comprising a radially expandable upper packer 12 arranged in the upper casing 5 above the upper edge 14 of the lower casing 7 and a radially expandable lower packer 16 arranged in the lower casing 7. The packer 12, 16 are interconnected by a tubular element 18 provided with a plurality of openings 20 in the wall thereof. Each packer 12, 16 is internally provided with an contractible memory metal element (not shown) for radially expanding the packer against the respective casing 5, 7 and with an electric heating coil (not shown) for activating the memory metal element. The packers 12, 16 are provided with suitable seals 21 for sealing the packers 12, 16 in their expanded position against the respective casing 5, 7.

The upper packer 12 is internally provided with a remotely controlled welding unit 22 having a welding electrode 24 and a tube 25. The electrode 24 and tube 25 are movable between a retracted position and an expanded position. In the retracted position the electrode 24 and tube 25 are located in a chamber (not shown) arranged within the upper packer 12, which chamber is sealed by a removable annular sealing member 26 fitting in a corresponding annular recess 28 (shown in dotted lines) provided in the upper packer 12 at the side facing the lower packer 16. The annular sealing member 26 is removable from the upper packer by the operation of a solenoid coil (not shown) which is capable of inducing the sealing member to drop down from the packer 12. In FIG. 1 the annular sealing member is shown removed from the upper packer 12. In the expanded position the electrode 24 and tube 25 extend through annular recess 28 into a volume portion 30 of the wellbore 1 defined by the space enclosed by the packers 12, 16 and the casings 5, 7. The welding unit is furthermore provided with means (not shown) for moving the electrode 24 and tube 25 in circumferential direction along the corner formed by the upper edge 14 of the lower casing 7 and the inner surface of the upper casing 5.

A tubular conduit 33 is connected to the welding unit 10 at upper packer 12 and extends through the wellbore 1 to a control unit (not shown) at surface, the conduit 33 being in fluid communication with the interior of the tubular element 18 and being provided with a control valve (not shown) at surface which, in open position, provides fluid communication of the conduit 33 to the atmosphere.

An electric cable 34 extends from the control unit trough the tubular conduit 33 to the welding system 10 and from there to the heating coils and to the solenoid coil. A fibre optical cable 35 extends from a monitoring unit (not shown) at surface trough the tubular conduit 33 to the welding system 10 and from there into the tube 25 so as to provide optical signals to the monitoring unit.

The control unit is adapted to selectively provide electric power and/or electric control signals via the cable 34 to the welding system 10, the heating coils, the solenoid coil and the camera.

An outlet conduit 36 extends from the lower packer 16 through the tubular element 18 and through the upper packer 12, which outlet conduit provides fluid communication between the volume portion 30 and the interior of the wellbore 1 above the welding unit 10. A non-return valve 38 prevents flow of fluid from the outlet conduit 36 into the volume portion 30.

During normal operation of the system used in the first embodiment, the wellbore 1 contains a wellbore fluid of selected density. The welding electrodes 24 are in their retracted position and the annular sealing member is located in the annular recess 28 so as to seal the electrodes from the wellbore fluid. The welding system 10 is suspended from the tubular conduit 33 and lowered through the wellbore to the location shown in FIG. 1 whereby the upper edge 14 of the lower casing 7 is located between the packers 12, 17. Electric power is then provided by the control unit via the cable 34 to the heating coils which thereby provide heat to the memory metal elements. Upon reaching their transition temperature the memory metal elements contract and thereby radially expand the packers 12, 16 which become engaged to the respective casings 5, 7 in a sealing manner.

The control valve at surface is closed and compressed inert gas, for example nitrogen, is pumped from surface trough the tubular conduit 33 and from there via the tubular element 18 and the openings 20 into the volume portion 30. By pumping the gas into the volume portion 30, wellbore fluid is evacuated from the volume portion 30 through the outlet conduit into the interior of the wellbore 1 above the welding unit 10. When the compressed gas has displaced substantially all wellbore fluid from the volume portion 30 pumping is stopped. The control valve is then opened to bleed off the gas pressure in the volume portion 30 and the tubular conduit 33 so that thereby the gas pressure is reduced to substantially atmospheric pressure. The non-return-valve 36 prevents return flow of wellbore fluid from the outlet conduit 36 into the volume portion 30.

The control unit is induced to provide electric power to the solenoid coil which thereby induces the annular sealing member 26 to drop down from the upper packer 12 onto the lower packer 16 (as shown in FIG. 1). The control unit is induced to provide electric power and electric control signals to the welding system 10 so that the welding electrodes 24 assume their expanded position at which the tips of the welding electrodes are positioned near the upper edge 14 of the lower casing 7. The control unit then induces the electrodes 24 to create a weld extending in circumferential direction along the corner formed by the upper edge 14 of the lower casing 7 and the inner surface of the upper casing 5. The weld seals the lower casing 7 to the 3 upper casing 5. During the welding process the camera is operated by the control unit in order to monitor the welding process at surface.

When the welding process is completed the welding system 10 is retrieved to surface by retrieval of the tubular conduit 33 from the wellbore 1.

The system used in the second embodiment is shown in FIG. 2, and includes a branch casing member 40 arranged in a main wellbore (not shown) provided with a branch wellbore (not shown), which branch casing member 40 is located at the branch point of the two wellbores and connects a main casing 42 extending through the main wellbore to a branch casing 44 extending into the branch wellbore. The branch casing 44 has an upper part 46 extending into a branch 48 of the branch casing member 40, which upper part has an outer diameter smaller than the inner diameter of the branch 48 and wherein a filler tube 50 is arranged in the annular space between said upper part 46 and said branch 48. The upper edge of the branch casing 44 has been welded to the filler tube 50 and the upper edge of the filler tube 50 has been welded to the branch 48 using the method of the invention.

Referring to FIG. 3, like reference numerals have been used for like components indicated in FIG. 1, therefore reference is made to FIG. 1 for a description of such components in FIG. 3. The embodiment shown in FIG. 3 differs from the embodiment of FIG. 1 in that the first element is formed by branch casing 44 and the second element is formed by branch casing 44. The outer diameter of upper part 46 is smaller than the inner diameter of branch 48.

Normal operation of the system of the second embodiment is largely similar to normal operation of the system of the first embodiment, except that the upper edge of branch casing 44 is welded to the filler tube 50 by weld 52 using the welding system 10, and the upper edge of the filler tube 50 is welded to the branch 48 by weld 54 using the welding system 10.

The second embodiment of the method of the invention is of particular interest if during running of the branch casing 46 into the branch wellbore the branch casing becomes stuck in the branch wellbore before having reached planned depth. The branch casing 46 is then cut at a level such that the upper 46 part of the branch casing remains in the branch 48, whereafter the filler tube 50 is installed and the welds 52, 54 are created using welding system 10. The cut upper section of the branch casing is removed from the wellbore.

We claim:

1. A method of creating a weld at an element arranged in a wellbore containing a wellbore fluid, the method comprising
   a) selecting a welding path along which the weld is to be created;
   b) selecting a volume portion of the wellbore, in which volume portion said path is located, and sealing said selected volume portion from the remainder of the wellbore volume;
   c) controlling the fluid pressure in said selected volume portion so as to reduce the fluid pressure in said selected volume portion to a selected pressure at which the weld can be created; and
   d) creating the weld along the selected welding path.

2. The method of claim 1, wherein step b) comprises installing a first packer and a second packer in the wellbore, said selected volume portion being located between the packers.

3. The method of claim 2, wherein the first packer is provided with a remotely controlled welding unit for creating said weld.

4. The method of claim 3, wherein the welding unit has at least one welding electrode sealed from the selected volume portion by removable sealing means.

5. The method of any one of claim 1, wherein said element is a first element and said weld connects the first element to a second element arranged in the wellbore.

6. The method of claim 5, wherein the first element is an upper wellbore casing and the second element is a lower wellbore casing having an upper part extending into a lower part of the upper wellbore casing.

7. The method of claim 6, wherein said upper part has an outer diameter substantially equal to the inner diameter of said lower part, and step d) further comprises welding the upper edge of the lower casing to the upper casing.

8. The method of claim 6, wherein said upper part has an outer diameter smaller than the inner diameter of the lower part, and wherein the method further comprises inserting a filler tube in the annular space between said upper part and said lower part, and wherein step e) comprises welding the upper edge of the lower casing to the filler tube and welding the upper edge of the filler tube to the upper casing.

9. The method of claim 5, wherein the wellbore is a main wellbore provided with a branch wellbore, said first element being a branch of a branch casing member which connects a main casing extending through the main wellbore to a branch casing extending through the branch wellbore, said second element being the branch casing.

10. The method of claim 1, wherein the step of controlling pressure includes providing a conduit having a control valve in fluid communication with said selected volume portion, the conduit extending through the wellbore to surface, and opening the control valve so as to allow the fluid pressure in said selected volume portion to decrease.

11. The method of claim 10, further including the step of evacuating wellbore fluid from said selected volume portion, prior to step d).

12. The method of claim 11, wherein the step of evacuating wellbore fluid includes an outlet conduit providing fluid communication between the selected volume portion and the remainder of the wellbore volume, and introducing a selected gas to flow into the selected volume portion so as to displace wellbore fluid from the selected volume portion through the outlet conduit into the remainder of the wellbore volume.

13. The method of claim 12, wherein the selected gas is induced to flow into said volume portion via said conduit.

14. The method of claim 13, wherein the outlet conduit is provided with a non-return valve preventing flow of wellbore fluid from the remainder of the wellbore volume into the selected volume portion.

* * * * *